United States Patent [19]
Dorto

[11] Patent Number: 4,749,229
[45] Date of Patent: Jun. 7, 1988

[54] CHILD RESTRAINT SEAT

[76] Inventor: Andrew J. Dorto, 1579 California Ave., Louisville, Ohio 44641

[21] Appl. No.: 93,765

[22] Filed: Sep. 8, 1987

[51] Int. Cl.$^4$ .................... A47C 15/00; B60N 1/12
[52] U.S. Cl. .................... 297/238; 297/113; 297/488
[58] Field of Search .................... 297/112–114, 297/238, 256, 417, 467, 487, 488

[56] References Cited

U.S. PATENT DOCUMENTS

| | | | |
|---|---|---|---|
| 2,337,480 | 12/1943 | Logan | 297/487 X |
| 2,974,718 | 3/1961 | Lawrence et al. | 297/468 X |
| 3,166,355 | 1/1965 | Rocker | 297/467 X |
| 4,230,366 | 10/1980 | Ruda | 297/216 X |
| 4,402,548 | 9/1983 | Masoa | 297/250 X |
| 4,533,176 | 8/1985 | Wyttenbach | 297/238 |
| 4,540,216 | 9/1985 | Hassel, Sr. | 297/112 X |
| 4,664,443 | 5/1987 | Casale | 297/238 |
| 4,690,455 | 9/1987 | Bailey et al. | 297/238 |

FOREIGN PATENT DOCUMENTS 2222251  12/1972  Fed. Rep. of Germany ...... 297/484

Primary Examiner—Kenneth J. Dorner
Assistant Examiner—Peter R. Brown
Attorney, Agent, or Firm—Jerry T. Kearns

[57] ABSTRACT

A child restraint seat is designed for use with a conventional bench type vehicle seat. A pair of frame rods are rigidly mounted in a recess provided in the seat back of a conventional bench type vehicle seat. These rods extend parallel to the seat back and are rigidly connected to the bench type seat frame. One U-shaped support bracket is attached to each rod. A padded U-shaped restraint member has the free ends pivotally mounted in the U-shaped support brackets. A padded restraint seat bottom portion is pivotally attached adjacent a lower edge of the bench seat back portion. This restraint seat bottom portion may be pivoted to a horizontal position independently of the rest of the child restraint seat for use as an armrest. Various restraint straps are also provided to assist in securing a child in the car restraint seat. The entire car restraint seat is pivotally mounted for movement between an operative open position and a closed storage position in which it is received within a recess provided in the bench seat back portion.

1 Claim, 2 Drawing Sheets

CHILD RESTRAINT SEAT

BACKGROUND OF THE INVENTION

1. Field of the Invention

The present invention relates to child restraint seats, and more particularly pertains to a child restraint seat for use with conventional bench type vehicle seats. The use of special child restraint seats in automobiles is required by state and federal ordinances. The child restraints seats now on the market are bulky and difficult to transport. If it is desired to provide additional seating room for adults, these conventional child restraint seats must be removed from the vehicle. This is an inconvenient and time consuming procedure. In order to overcome these problems, the present invention provides a child restraint seat which pivots to a closed position in which it is unobtrusively stored in a recess in the seat back of a conventional bench type vehicle seat.

2. Description of the Prior Art

Various types of child restraint seats are known in the prior art. A typical example of such a child restraint seat is to be found in U.S. Pat. No. 3,265,438, which issued to E. Regan et al on Aug. 9, 1966. This patent discloses a portable child restraint seat constructed from a plurality of inflatable cells which may be connected together by snap fasteners. In use, the child restaint seat is inflated, the child then sits in the seat and secures the restraint seat to a conventional bench type vehicle seat through the use of a conventional automobile safety belt. U.S. Pat. No. 4,291,915, which issued to J. Cox on Sept. 29, 1981, discloses a combined suitcase and safety seat for use on a conventional bench type vehicle seat. Loop straps are provided for the securement of the seat utilizing a conventional automobile safety belt. U.S. Pat. No. 4,311,339, which issued to R. Heath on Jan. 19, 1982, discloses a container for carrying an infant in a supine position, having an open top which is covered by a flexible cover of resilient perforate material, provided with seatbelt retention means such that it can be retained to the rear seat of a vehicle having seatbelts therein, and in the event of vehicle impact, an infant is supported over a large area of its body. U.S. Pat. No. 4,441,221, which issued to K. Enste et al on Apr. 10, 1984, discloses a gymnastic and support wedge for babies and toddlers, especially for multiple and severly handicapped children of kindergarten and school age, including a wedge-like base plate member, a pair of lateral trough wedge members mounted on the base plate member and a plurality of differently shaped individual members mountable between the trough wedge members in any desired position. All of these parts are detachably connected with each other. In one configuration, this device may be utilized as a car restraint seat. U.S. Pat. No. 4,613,188, which issued to H. Tsuge et al on Sept. 23, 1986, discloses a child restaining device for use on conventional vehicle seats which is provided with a reclining mechanism including a supporting member for supporting a child receiving vessel mounted rotatably in a step manner thereon through crank means. The device is configured for securement on a conventional vehicle seat through the use of conventional automobile safety belts.

While the above mentioned devices are suited for their intended usage, none of these devices provides a child restraint seat for use in vehicles which may be pivoted to an unobtrusive storage position. Further, all of the above child restraint seats are bulky as well as difficult and time consuming to transport. An additional feature of the present invention, not contemplated by the aforesaid devices, is the provision of a child restraint seat for use with conventional bench type vehicle seats which may also serve as a pivotal armrest. Inasmuch as the art is relatively crowded with respect to these various types of child restraint seats, it can be appreciated that there is a continuing need for and interest in improvements to such child restraint seats, and in this respect, the present invention addresses this need and interest.

SUMMARY OF THE INVENTION

In view of the foregoing disadvantages inherent in the known types of child restraint seats now present in the prior art, the present invention provides an improved child restraint seat. As such, the general purpose of the present invention, which will be described subsequently in greater detail, is to provide a new improved child restraint seat which has all the advantages of the prior art child restraint seats and none of the disadvantages.

To attain this, a representative embodiment of the concepts of the present invention is illustrated in the drawings and makes use of a pair of frame rods mounted in a recess provided in a seat back portion of a conventional bench type vehicle seat. The frame rods extend parallel to the seat back portion and are rigidly connected to the frame thereof. The present invention further utilizes a padded U-shaped restraint member pivotally connected to the frame rods for movement between an operative open position and a closed storage position. The present invention further provides various restraint straps to assist in restraining a child in the restraint seat of the present invention. An additional feature contemplated by the present invention is the use of a center strap removably connected between the padded U-shaped restraint member and a restraint seat bottom portion. By virtue of this construction, the restraint seat bottom portion may be independently pivoted to an open position for use as an armrest.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child restraint seat which has all the advantages of the prior art child restraint seats and none of the disadvantages.

It is another object of the present invention to provide a new and improved child restraint seat which may be easily and efficiently manufactured and marketed.

It is a further object of the present invention to provide a new and improved child restraint seat which is of a durable and reliable construction.

An even further object of the present invention is to provide a new and improved child restraint seat which is susceptible of a low cost of manufacture with regard to both materials and labor, and which accordingly is then susceptible of low prices of sale to the consuming public, thereby making such child restraint seats economically available to the buying public.

Still another object of the present invention is to provide a new and improved child restraint seat which provides in the apparatuses and methods of the prior art some of the advantages thereof, while simultaneously overcoming some of the disadvantages normally associated therewith.

Still another object of the present invention is to provide a new and improved child restraint seat which is pivotally mounted for movement between an open operative position and an unobtrusive storage position.

Yet another object of the present invention is to provide a new and improved child restraint seat for use with conventional bench type vehicle seats which may also be utilized as an armrest.

Even still another object of the present invention is to provide a new and improved child restraint seat for use in vehicles which may be pivoted to an unobtrusive storage position, thus avoiding the necessity of transporting bulky and cumbersome child restaint seats.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
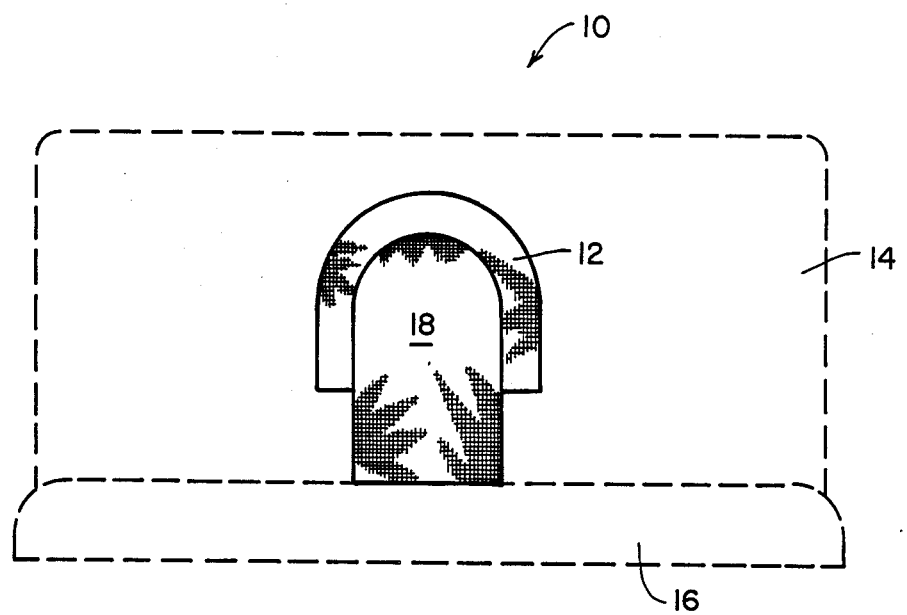
FIG. 1 is a front view of the child restraint seat of the present invention mounted on a conventional bench type vehicle seat and in a closed position.

With reference now to the drawings, and in particular to FIG. 1 thereof, a new and improved child restraint seat embodying the principles and concepts of the present invention and generally designated by the reference numeral 10 will be described.

More specifically, it will be noted that the first embodiment 10 of the invention includes a generally U-shaped upper restraint portion 12 and a restraint seat bottom portion 18. These restraint elements are shown pivoted to their closed storage position, mounted in a recess on a conventional bench type vehicle seat back portion 14.

Figure 2:
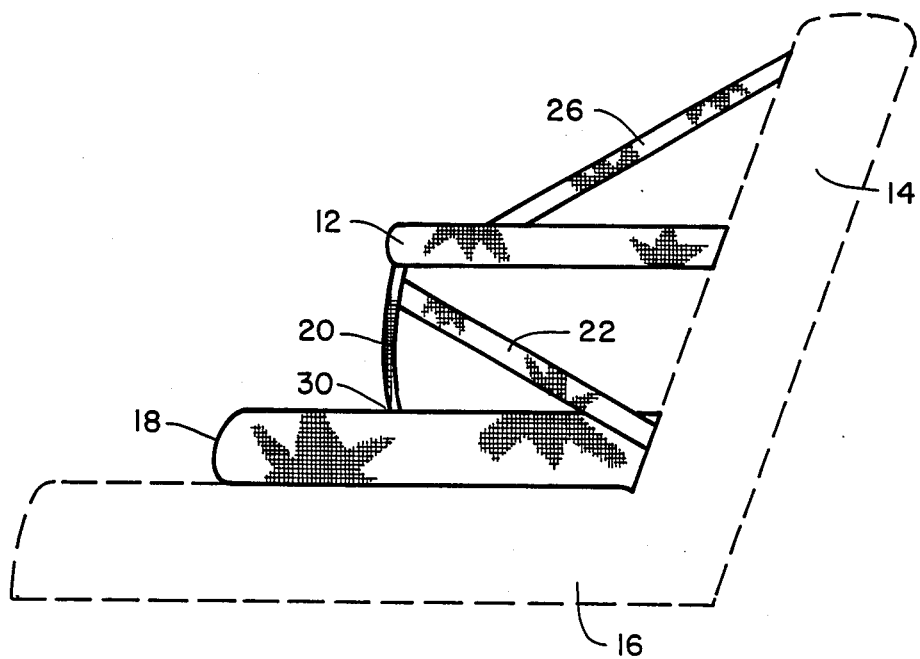
FIG. 2 is a side view of the child restraint seat of the present invention pivoted to an open position.

With reference now to FIG. 2, the child restraint seat 10 of the present invention is shown pivoted to an operative open position. In this position the restraint seat bottom portion 18 rests upon the conventional bench type vehicle seat portion 16. The U-shaped upper restraint portion is held in a generally horizontal position by a pair of straps, one of which 26 is shown. The U-shaped upper restraint portion is connected to the restraint seat bottom portion 18 by strap 20. This strap is rigidly connected to the upper restraint portion 12 and is removably connected to the restraint seat bottom portion 18 at 30 by conventional means such as a snap fastener. Two side straps, one of which 22 is shown, are attached to the center strap 20. These straps create a pair of leg openings for the reception of a child's legs when the child restraint seat is in use.

The upper restraint portion 12 and restraint seat bottom portion 18 are preferably constructed from a rigid plastic or metal frame covered by padding and a fabric upholstery material. Upholstery matching the car interior may, of course, be provided. The various restraint straps are preferably formed from a conventional material such as fabric webbing, plastic or leather covered by a padding material. These various materials are well known in the art, and form no part of the present invention.

Figure 3:
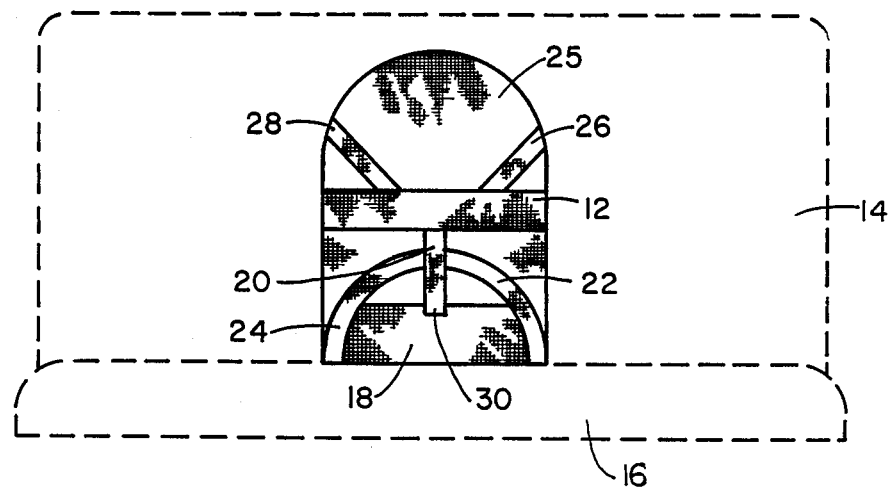
FIG. 3 is a front view of the child restraint seat device of the present invention pivoted to an open position.

With reference now to FIG. 3, a front view of the child restraint seat 10 of the present invention in an open operative position is provided. The U-shaped upper restraint portion 12 is pivoted outwardly from a recess 25 formed in the bench seat back portion 14. Straps 26 and 28, which are securely fastened to the upper restraint portion 12, serve to maintain the upper restraint portion 12 in a horizontal position. The ends of straps 26 and 28 are fastened to frame rods to be subsequently described. Center strap 20 is securely fastened, by means of stitching or the like, to a central portion of the upper restraint 12. The other end of the central strap 20 is removably connected by conventional means, for example a snap fastener, at 30 to the lower restraint seat bottom portion 18. By unfastening the strap 20 from the seat restraint portion 18, the seat restraint portion 18 may be pivoted to the illustrated open position while the other elements of the child restraint seat remain stored within recess 25. In this position, the restraint seat bottom portion 18 may be utilized as an armrest.

Figure 4:
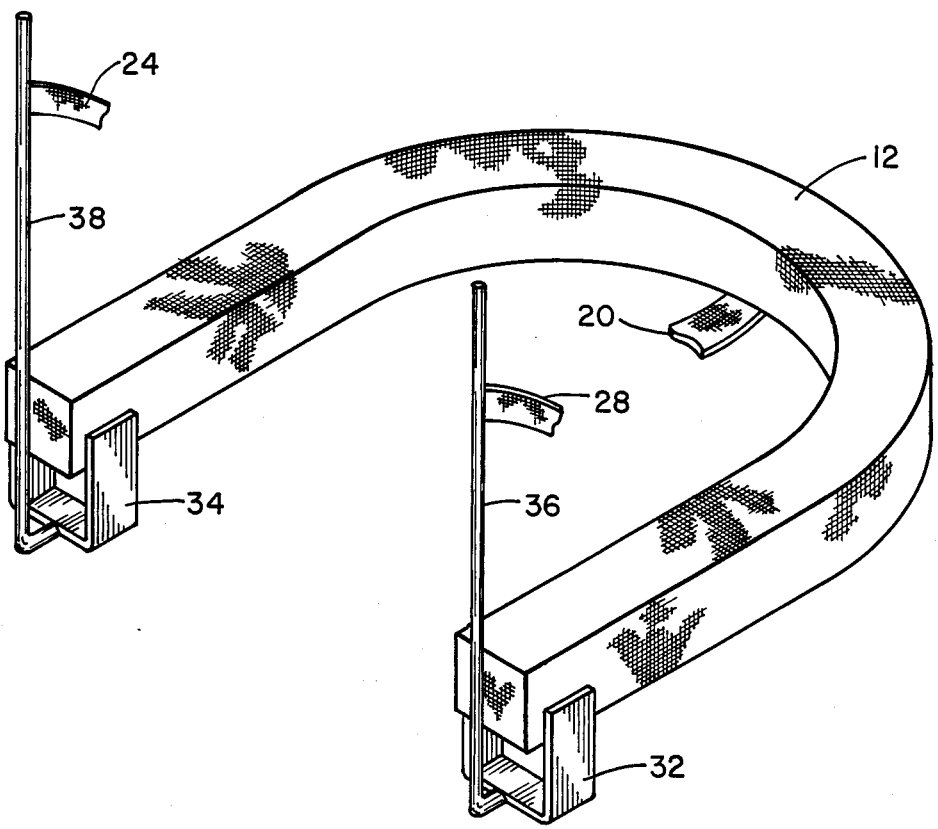
FIG. 4 is a perspective view of a portion of the child restraint seat device of the present invention, illustrating the frame rods thereof.

With reference now to FIG. 4, the manner of mounting the child restraint seat of the present invention will now be described. A pair of frame rods 36 and 38 are rigidly connected to the frame of the bench type seat back portion 14 within the recess 25. This connection may be accomplished by utilizing conventional means such as wire fasteners or by soldering. Each of the frame rods 36 and 38 are provided with a generally U-shaped support bracket 32 and 34. End portions of the U-shaped upper restraint portion 12 are pivotally mounted in the brackets 32 and 34. The ends of straps 26 and 28 are securely fastened to the rods 36 and 38. The opposite ends of the straps 26 and 28 are securely connected to an upper portion of the U-shaped upper restraint member 12, as illustrated in FIG. 3. The restraint seat bottom portion 18 is secured adjacent a lower edge portion of the bench seat back 14 within the recess 25. This securement may be accomplished by utilizing a conventional armrest pivot bracket. The upper restraint portion 12 is maintained in the closed position by virtue of frictional engagement with the sides of the recess 25. The restraint seat bottom portion 18 is maintained in the closed portion by frictional engagement with the upper restraint portion 12. Alternatively, suitable fasteners may be provided for this purpose.

With reference now to FIG. 1, the manner of usage of the child restraint seat of the present invention will now be described. If it is desired to utilize the restraint seat bottom portion 18 as an armrest, it is merely necessary to pivot the member 18 to a horizontal position, as in the manner of usage of conventional automobile pivoted armrest. If it is desired now to utilize the child restraint seat of the present invention for the purpose of carrying a small child, both the restraint seat bottom portion 18 and the U-shaped upper restraint portion 12 are pivoted to a horizontal position, as illustrated in FIG. 2. Strap 20 is then fastened to the restraint seat bottom portion 18 at 30. The child is then lowered into the restraint seat between straps 26 and 28 as shown in FIG. 3. The legs of the child are extended through the openings on either side of the center strap 20. In this position straps 22, 24 and 20 form a yoke for the secure restraint of the child's legs and lower body. The upper restraint portion 12 is received across the upper torso of the child and serves to restrain the child from both forward and lateral motion. Straps 26 and 28 serve to restrain the shoulders of the child. When it is desired to provide additional adult seating, the child restraint seat 10 of the present invention is merely pivoted to the closed position illustrated in FIG. 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved child restraint seat for use in vehicles having a conventional bench type seat including a seat bottom portion and a seat back portion, comprising:

a recess having an arcuate top wall formed in said conventional vehicle bench type seat back portion;

a pair of spaced frame rods in said recess extending parallel to said bench type seat back portion and being rigidly connected to a frame of said conventional bench type seat back portion;

a generally U-shaped support bracket connected to each of said frame rods;

a padded restraint seat bottom portion having an arcuate end surface, said padded restraint seat bottom portion pivotally mounted in said recess beneath and between said support brackets;

a padded U-shaped upper restraint portion having an arcuate end surface and forming an arcuate recess, said U-shaped upper restraint seat portion having the ends thereof pivotally mounted in said support brackets;

said arcuate end surface of said U-shaped upper restraint seat portion dimensioned for frictional engagement with said arcuate top wall of said recess in said bench seat back portion;

said arcuate end surface of said padded restraint seat bottom portion dimensioned for frictional engagement in said arcuate recess formed by said U-shaped upper restraint portion;

a center strap having one end rigidly attached to said upper restraint portion and having the other end removably connected to said restraint seat bottom portion;

a pair of shoulder straps each having a first end connected to one of said frame rods and a second end attached to said upper restraint portion; and a pair of side straps each having a first end connected to a lower portion of said bench seat back frame and a second end connected to said center strap.

* * * * *